(12) United States Patent
Buchen et al.

(10) Patent No.: US 9,638,294 B2
(45) Date of Patent: May 2, 2017

(54) BELT TENSIONING DEVICE

(71) Applicant: Muhr und Bender KG, Attendorn (DE)

(72) Inventors: Thomas Buchen, Drolshagen (DE); Jan Diblik, Mokrovraty (CZ); Frederik Vollmer, Schmallenberg-Dorlar (DE)

(73) Assignee: Muhr und Bender KG, Attendorn (DE)

( * ) Notice: Subject to any disclaimer, the term of this patent is extended or adjusted under 35 U.S.C. 154(b) by 14 days.

(21) Appl. No.: 14/677,038

(22) Filed: Apr. 2, 2015

(65) Prior Publication Data
US 2015/0285344 A1 Oct. 8, 2015

(30) Foreign Application Priority Data

Apr. 8, 2014 (DE) .......................... 10 2014 206 716

(51) Int. Cl.
*F16H 7/12* (2006.01)
*F16H 7/08* (2006.01)

(52) U.S. Cl.
CPC ............. *F16H 7/1281* (2013.01); *F16H 7/12* (2013.01); *F16H 7/1209* (2013.01); *F16H 2007/081* (2013.01); *F16H 2007/0865* (2013.01); *F16H 2007/0893* (2013.01)

(58) Field of Classification Search
CPC ............ F16H 2007/081; F16H 7/1218; F16H 2007/084; F16H 2007/0893; F16H 7/18
USPC .................................................. 474/135, 133
See application file for complete search history.

(56) References Cited

U.S. PATENT DOCUMENTS

| | | | | |
|---|---|---|---|---|
| 4,557,709 A | * | 12/1985 | St. John | ................ F16H 7/1218 474/117 |
| 4,832,664 A | * | 5/1989 | Groger | ...................... F01L 1/02 123/90.15 |
| 5,575,727 A | * | 11/1996 | Gardner | ................ F16H 7/1281 474/135 |
| 5,653,652 A | * | 8/1997 | Simpson | ................... F16H 7/08 474/110 |
| 5,803,850 A | * | 9/1998 | Hong | .................... F16H 7/1218 474/101 |
| 6,412,464 B1 | * | 7/2002 | Schneider | ................. F01L 1/02 123/90.15 |

(Continued)

FOREIGN PATENT DOCUMENTS

| DE | 10333876 A1 | 2/2005 |
|---|---|---|
| DE | 102007051747 A1 | 5/2008 |

(Continued)

*Primary Examiner* — Henry Liu
(74) *Attorney, Agent, or Firm* — Bejin Bieneman PLC

(57) ABSTRACT

A belt tensioning device for a belt drive comprises a base member that is firmly connectable to a stationary component; at least one tensioning arm, which is pivotably supported relative to the base member around a pivot axis; a spring element, with which the tensioning arm is supported elastically in circumferential direction, wherein the ratio of the nominal diameter to the axial length of the spring element is larger than 3.0 in the mounted condition; and a tensioning roller for tensioning the belt, which is rotatably supported on the tensioning arm around an axis of rotation; wherein the base member and the tensioning arm are each at least partially made from plastic material.

19 Claims, 4 Drawing Sheets

(56) References Cited

U.S. PATENT DOCUMENTS

Figure 5:
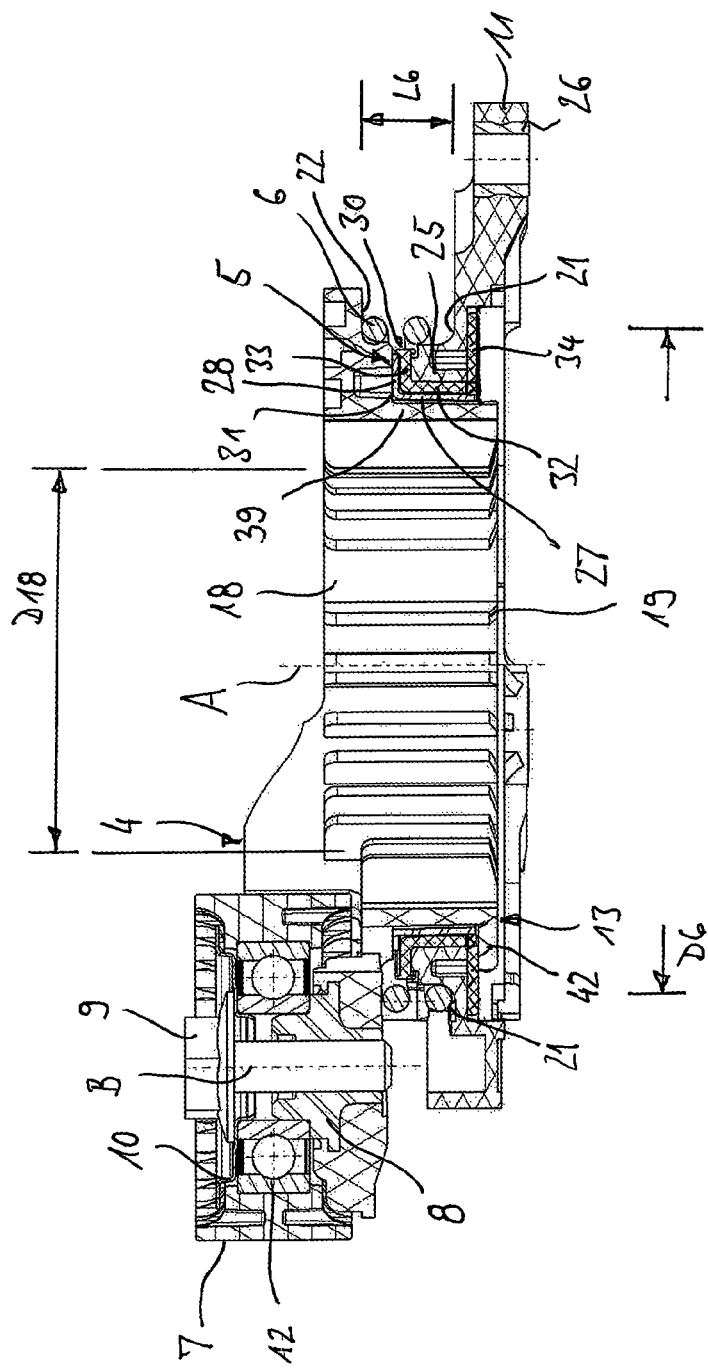

| Publication | Date | Inventor | Class |
|---|---|---|---|
| 2003/0119615 A1* | 6/2003 | Meckstroth | F16H 7/1218 474/135 |
| 2004/0009836 A1* | 1/2004 | Dix | F16H 7/1218 474/135 |
| 2004/0097311 A1* | 5/2004 | Smith | F16H 7/1281 474/135 |
| 2005/0026730 A1* | 2/2005 | Hashimoto | F16H 7/18 474/111 |
| 2005/0227800 A1* | 10/2005 | Shum | F16H 7/18 474/140 |
| 2005/0239590 A1* | 10/2005 | Foster | B65G 21/22 474/140 |
| 2006/0293135 A1* | 12/2006 | Quintus | F16H 7/1218 474/135 |
| 2008/0132365 A1* | 6/2008 | Boussaguet | F16C 13/006 474/136 |
| 2009/0005202 A1* | 1/2009 | Crist | F16H 7/1218 474/135 |
| 2009/0131208 A1* | 5/2009 | Hawryluck | F16H 7/1218 474/135 |
| 2010/0323833 A1* | 12/2010 | Quintus | F16H 7/1218 474/135 |
| 2011/0294615 A1* | 12/2011 | Crist | F16H 7/1218 474/135 |
| 2011/0300976 A1* | 12/2011 | Lannutti | F16H 7/1218 474/135 |
| 2012/0058848 A1* | 3/2012 | Lannutti | F16H 7/1218 474/135 |
| 2012/0115657 A1* | 5/2012 | Antchak | F16H 7/1218 474/135 |
| 2013/0079185 A1* | 3/2013 | Schauerte | F16H 7/1281 474/135 |
| 2013/0085027 A1* | 4/2013 | Meckstroth | F16H 7/1218 474/135 |
| 2013/0116073 A1* | 5/2013 | Liebel | F16H 7/10 474/135 |
| 2013/0260933 A1* | 10/2013 | Dutil | F16H 7/1218 474/135 |
| 2014/0274511 A1* | 9/2014 | Lannutti | F16H 7/1218 474/135 |
| 2014/0287860 A1* | 9/2014 | Ma | F16H 7/1218 474/135 |

FOREIGN PATENT DOCUMENTS

| | | |
|---|---|---|
| DE | 102007015676 A1 | 10/2008 |
| DE | 102011003113 A1 | 7/2012 |
| EP | 0659249 B1 | 2/1998 |
| EP | 2573423 A1 | 3/2013 |
| JP | 2011202778 A | 10/2011 |
| WO | 2004030985 A2 | 4/2004 |
| WO | 2006105656 A1 | 10/2006 |

* cited by examiner

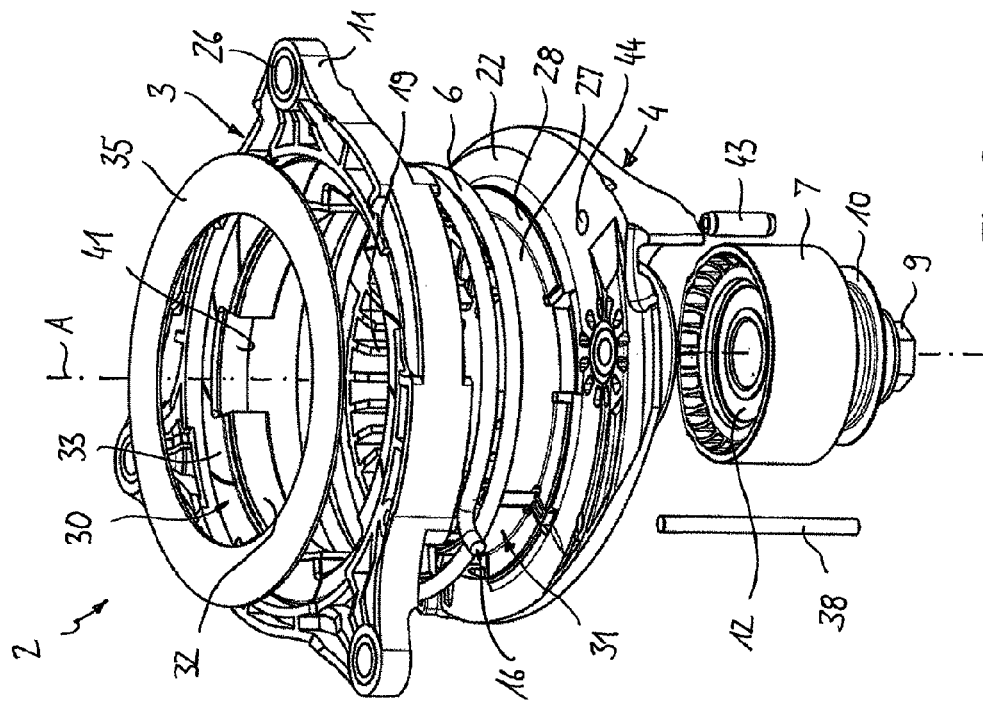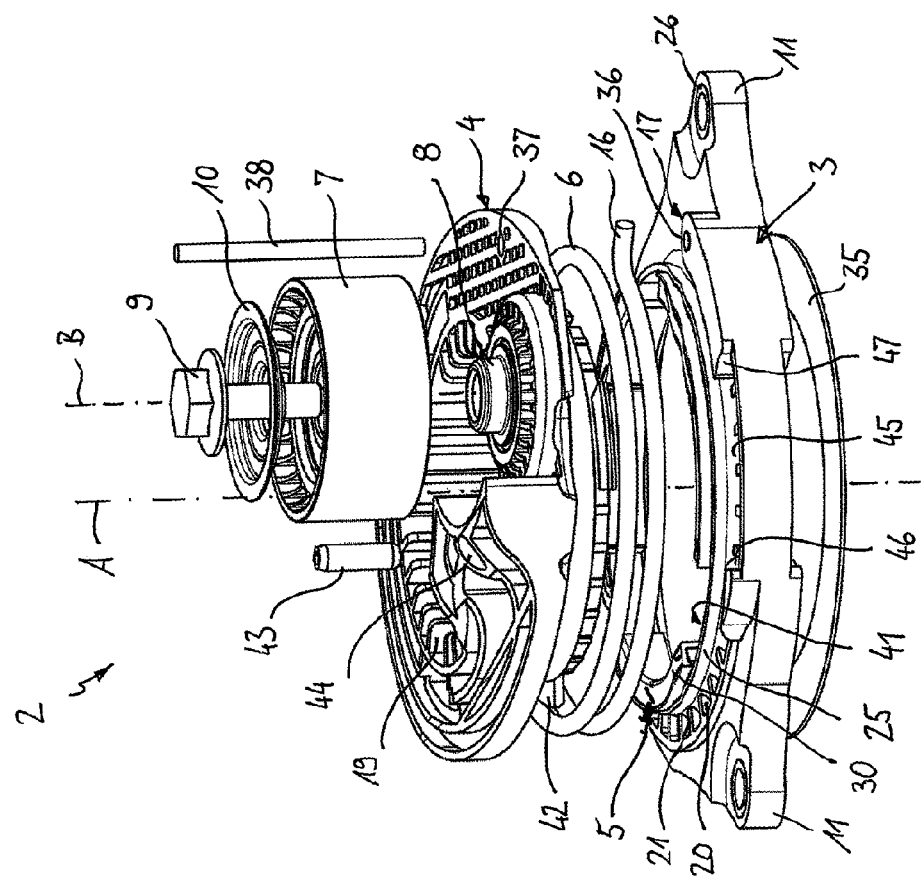

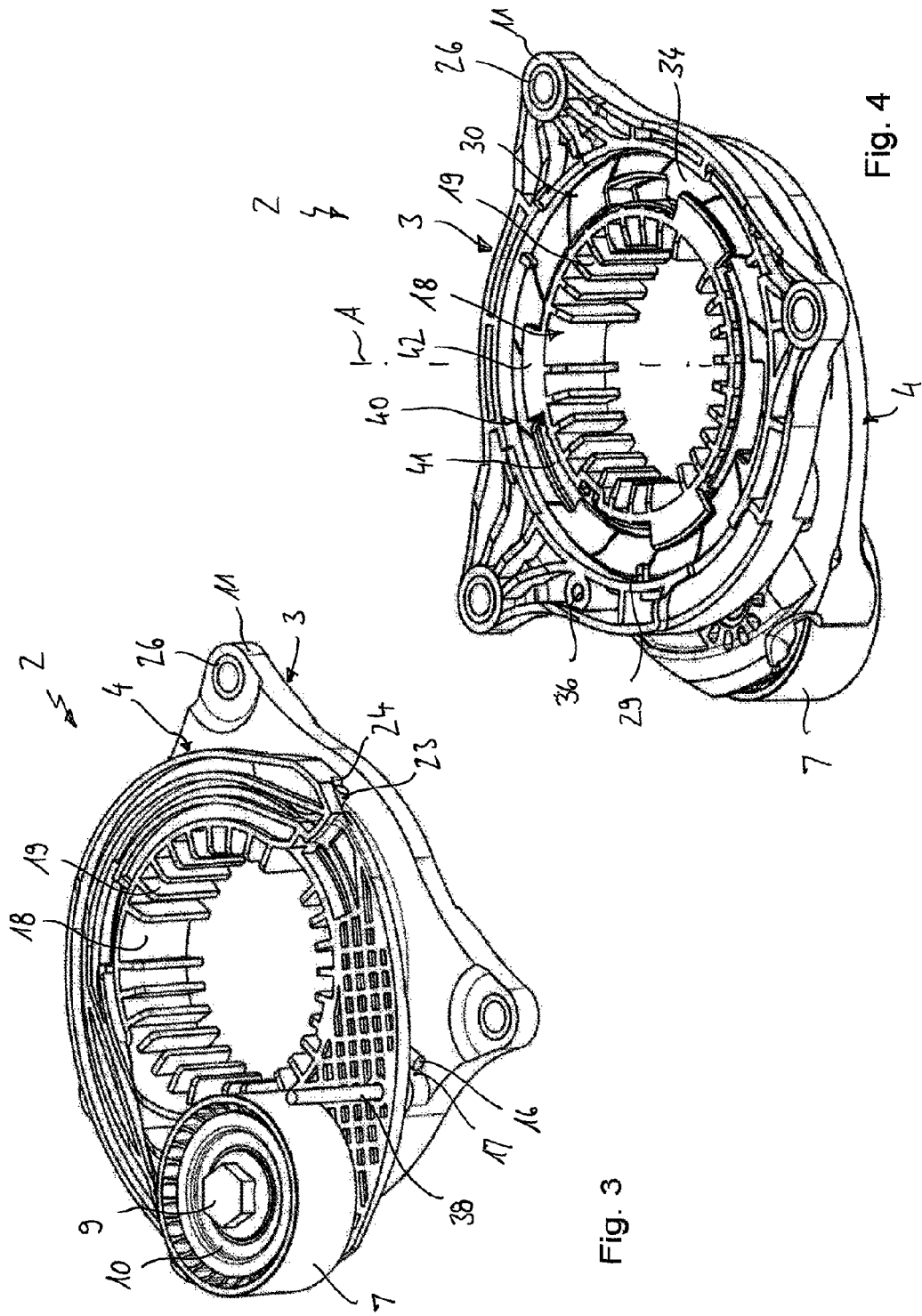

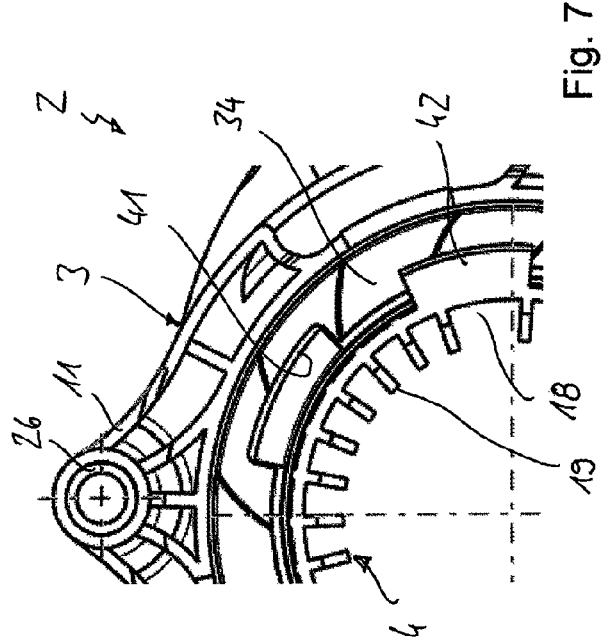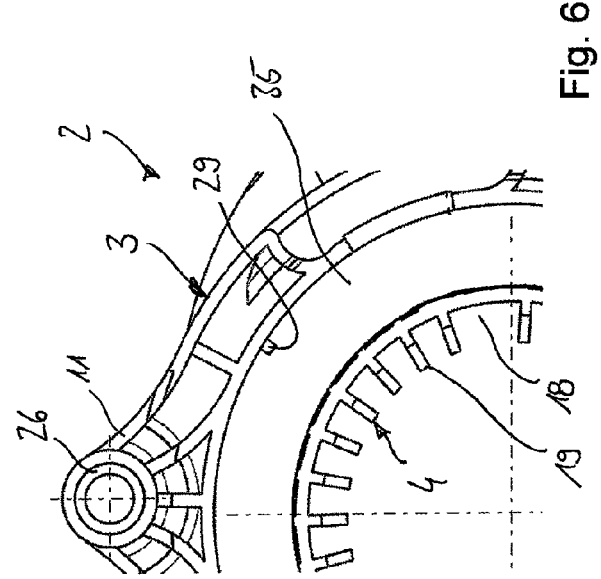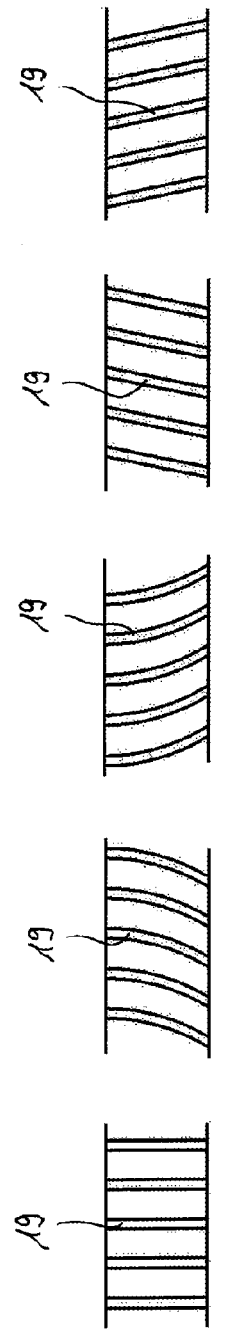

BELT TENSIONING DEVICE

CROSS-REFERENCE TO RELATED APPLICATIONS

This application claims the benefit of priority from German Patent Application No. DE 10 2014 206 716.2, filed Apr. 8, 2014. The entire contents of the said foregoing German application are hereby incorporated herein by reference in their entirety.

BACKGROUND

A belt tensioning device for a belt drive flat commonly has a continuous belt and at least two belt pulleys, of which one can function as a drive and one can function as an output of the belt drive. Such belt drives are especially used on combustion engines of a motor vehicle for driving accessories, wherein a first belt pulley sits on the crankshaft of the combustion engine and drives the belt. Further belt pulleys are assigned to the accessories, like for example water pump, electric generator or air conditioning compressor, and are rotatingly driven by the belt drive. The accessories are usually configured as consumers, i.e. they are driven by the belt pulley of the crankshaft via the belt. A slack side of the belt is formed between the crankshaft and the accessory adjoining the crankshaft in circumferential direction of the belt, said adjoining accessory typically being a generator. To ensure a sufficient wrap of the belt around the belt pulley, the belt is pretensioned by a tensioning roller of the belt tensioning device.

From EP 2 573 423 A1 a belt tensioning device for a belt drive of the above named type is known. The belt tensioning device has a base body, on which a tensioning arm is pivotably supported. The belt tensioning device is formed such that the pivot axis of the tensioning arm is arranged in the mounted condition within the outer diameter of the belt pulley of the accessory.

The efforts for reducing the fuel consumption or for reducing the CO2-emission are accompanied by the requirement for reducing the weight of vehicle components. Furthermore, in the field for belt tensioning devices the approaches for reducing the weight have already been pursued.

From EP 0 659 249 B1 a belt tensioning device with a carrier element and a tensioning arm is known. The tensioning arm can be made from metal or plastics. The tensioning arm is pivotably supported on the carrier element. The carrier element can be a metal or plastic lid, a mounting plate or a bracket.

From WO 2006/105656 A1 a belt tensioner for a belt drive is known. The belt tensioner comprises an arm and a pivot bushing, around which the arm is pivotably supported. The arm is a plastic molded part. Fiber reinforced organic resin material is used as plastic material. As reinforcing material glass fibers, aramid fibers, carbon fibers, steel fibers or nano-particles can be used.

Especially in compactly constructed belt tensioners high rotational variations in the belt drive, which are caused by changing from engine operation to starter operation, lead to a high friction and corresponding thermal loading of the belt tensioner. High requirements concerning the dampening of the system in the starter operation are connected therewith.

From DE 2011 003 113 A1 a tensioning device is known with a roller and a tensioner for travelling and dampening a movement of the roller. The tensioner has a housing, in which a spring and if necessary a damper are arranged. A cooling body with several cooling ribs is provided on the outside of the housing.

From DE 10 2007 015 676 A1 a tensioning device with a housing and a tensioning lever with a rotatable tensioning roller is known. Between the housing and the tensioning lever a helical spring is effectively arranged. On an end of the spring, a brake shoe is arranged, which can be pushed against a cylindrical inner wall of the housing for a good heat transfer.

From DE 103 33 876 A1 a tensioning element is known with a belt pulley, which is rotatably supported by a rolling bearing on an attachment member, and with a spacer, on which the inner bearing race of the rolling bearing is arranged. The spacer is in thermal contact with the inner bearing race and is made from a material with good thermal conductivity.

DESCRIPTION

Disclosed herein is a belt tensioning device for a belt drive, which has a low weight, can be manufactured in a simple manner and cheaply, and has good dampening characteristics, so that it can withstand especially the technical requirements for the use in a belt drive with a starter generator over a long life time.

The present belt tensioning device for a belt drive can comprise a base member which is firmly connectable to a stationary component; at least one tensioning arm which is pivotably supported relative to the base body around a pivot axis; a spring element which resiliently supports the tensioning arm in circumferential direction, wherein the ratio of the nominal diameter to the axial length of the spring element is larger than 3.0 in the mounted condition; and a tensioning roller for tensioning the belt, which is rotatably supported on the tensioning arm around an axis of rotation (B); wherein the base member is at least partially made from plastic material, and wherein the tensioning arm is at least partially made from plastic material.

An advantage of the belt tensioning device is that it is designed especially compact because of the specific size ratio concerning the spring and has a low weight because of plastic material being used for the base member and the tensioning arm. All in all, the belt tensioning device has a low inertia, so that the span of the belt tensioning force is reduced. That the belt tensioning device has elements at least partially made from plastics includes the possibilities that the base member and the tensioning arm each have portions made from plastic material, or that the basic material of the base member and the tensioning arm is a plastic material, into which elements made from another material can be integrated, or that the base member and the tensioning arm are completely made from plastic material.

According to a first possibility, the belt tensioning device can be designed as a one-arm tensioner, i.e., having exactly one tensioning arm. In this case, the tensioning arm is elastically supported in circumferential direction via the spring means against the base member. According to a second possibility the belt tensioning device can also be configured as two-arm tensioner, i.e., having exactly two tensioning arms. In this case, the two tensioning arms are supported against each other via the spring means in a circumferential direction. In an embodiment as a two-arm tensioner, the first and/or the second tensioning arm can at least be partially manufactured from plastic material. It is to be understood that in this disclosure all features relating to "a" or "the" tensioning arm, are also valid to the same extent for a second tensioning arm.

Two-arm tensioners can be used in belt drives, in which as a further accessory a starter generator is integrated into the belt drive, i.e., an electric motor, which can be operated depending on the operational condition as a starter or alternator (generator). In the normal operation or engine operation, the belt pulley on the crankshaft is the driving pulley, while the starter generator and all the other accessories are driven. In the starting operation, the starter generator drives the crankshaft via the respective belt pulley, to start the combustion engine. In such belt drives with starter generator as an accessory aggregate, a change between the driving side and the driven side takes place between the engine operation and the starting operation to both sides of the belt pulley of the starter generator. Thus, it is necessary to provide spring loaded tensioning rollers for both of said sides and thus two tensioning arms, of which respectively one is effective on the driven side by a spring force, while the other one is pushed back by the tensioned driving side.

According to an embodiment, a connection mechanism for connecting the tensioning arm to the base member is provided, wherein the connection mechanism has at least one first connection element which is associated to the base member, and at least one second connection element which is associated to the tensioning arm, wherein the first and the second connection elements are formed such that the tensioning arm and the base member are connectable to each other by an insertion and rotational movement. Insofar, said connection functions according to the type of a bayonet connection. Thus, a simple mounting of the belt tensioning device is achieved. The connection mechanism can be formed such that the tensioning arm is insertable into the base member in exactly one predetermined rotational position. In this manner the mounting is simplified and the mounting time is shortened. Such error preventing principles are also designated as "Poka Yoke".

Preferably, a glass fiber reinforced plastic is used as a material for the base member and the tensioning arm. The base member and/or the tensioning arm can have at least one reinforcing element made from a metal material, which is can be over-molded with the plastic material. At least one reinforcing element means, that one or more reinforcing elements can be provided in the base member or in the tensioning arm, respectively. To be clear, when presently one or the reinforcing element is mentioned, application for any other reinforcing element is to be understood. The reinforcing element can for example have the shape of a bushing, which can be injection molded in the plastic material, respectively over-molded with plastic. More particularly, the tensioning arm can have a reinforcing bearing bushing or a bearing element made from a metal material for rotatably supporting the tensioning arm on a bearing element of the base member. Furthermore, the base member can have reinforcing bushings made from a metal material for attaching the base member on a stationary component such as an accessory.

A bearing arrangement can be provided for rotatably supporting the tensioning arm relative to the base member. The bearing arrangement is preferably configured as plain bearing and can comprise at least one first bearing element which is associated to the base member, and at least one second bearing element which is associated to the tensioning arm, wherein pairs of frictional faces are formed between said bearing elements. More particularly, the bearing arrangement can comprise an axial bearing and a radial bearing. Axial- and radial bearings can functionally be formed separately, i.e., the axial bearing serves purely for absorbing axial forces between the tensioning arm and the base member, while the radial bearing purely serves for absorbing radial forces. It is to be understood, however, that also combined axial/radial bearings can be used.

According to a preferred embodiment, the bearing elements of the base member are arranged in segments along the circumference, with a respective recess being formed between each two circumferentially neighboring bearing elements, so that the tensioning arm can be inserted into the base member. Thus, an axial mounting of the tensioning arm relative to the base member is enabled. Furthermore, the bearing elements can be pre-manufactured as integral components of the base member and form one unit. For this the bearing elements can be made of a low friction plastic material, which differs from the plastic material of the base member and can be injection molded thereinto during production. Basically it is possible, that the base member is made from several plastic materials, which can have different material characteristics. The production can especially be carried out by means of a multi component injection molding process, in which different plastic materials are used in one tool and in one working step.

According to a preferred embodiment, the base member and/or the at least one tensioning arm has an opening into which a drive shaft and/or a belt pulley of an accessory (aggregate) can extend in the mounted condition. Preferably, a bushing portion of the tensioning arm is inserted into an annular portion of the base member. A wall of the tensioning arm enclosing the opening is preferably provided with circumferentially distributed ribs. The ribs fulfil especially two functions, namely they transfer frictional heat occurring during operation away from the belt tensioning device. Furthermore, the ribs contribute to a targeted air supply in direction to the accessory, on which the belt tensioning device is attached, to effectively cool the same. More particularly, the ribs can extend in a straight line, at an angle or in an arched manner in relation to a longitudinal axis of the opening. An angled extension of the ribs should comprise all shapes, in which the flanks of the ribs or parts thereof extend crooked or not parallel to the longitudinal axis. The ribs can especially also be formed helical or shovel-like.

According to an embodiment, the belt tensioning device can have at least one damping element which is made from a damping, respectively stock-absorbing material, which differs from the plastic material of the base member and that of the tensioning arm. With such a damping element, the damping behavior of the belt tensioner can be improved. The damping element can be made from a softer plastic material, for example an elastomer or TPE, which can arranged in a suitable position separately or can be integrally injection molded therein, for example by a multi component injection molding process.

The spring element can be part of a spring arrangement that can comprise at least one or exactly one spring, which extends around the longitudinal axis. Preferably, the spring element is formed as a helical spring, wherein a spring axis extends at least substantially parallel to the pivot axis A, wherein the helical spring preferably has a number of at most three complete turns (coils), more particularly less than three complete turns, especially a maximum of two complete turns, respectively less than two complete turns. A complete or full turn in particular means an extension of a turn over 360° around the spring axis. The turns of the helical spring can also be referred to as coils. For an especially compact design of the belt tensioning device it is advantageous if the ratio of the nominal diameter of the helical spring to the axial length of the helical spring is larger than 4.0, especially larger than 5.0, in the mounted condition. Thus, the belt tensioning device can be mounted at an end side of the accessory, without using additional space in the surrounding of the accessory. Alternatively, the spring element can also be formed as a yoke spring, bendable spring or torsional spring, which extends in circumferential direction with less than one complete turn. It is also possible that the spring arrangement comprises one or more helical springs, which spring center lines or spring axis extends in the mounted condition in circumferential direction around the pivot axis A of the belt tensioning device.

Example embodiments are described below with reference to the drawings, which show:

FIG. 1 an exemplary belt tensioning device in an exploded view in a first perspective from diagonally above;

FIG. 2 the belt tensioning device of FIG. 1 in a second perspective view from diagonally below;

FIG. 3 the belt tensioning device of FIG. 1 in the mounted condition in a perspective view from diagonally above;

FIG. 4 the belt tensioning device of FIG. 1 in the mounted condition in a perspective view from diagonally below;

FIG. 5 the belt tensioning device of FIG. 1 in a longitudinal sectional view;

FIG. 6a detail of the belt tensioning device of FIG. 1 in an axial view from below in the mounting position;

FIG. 7 the detail of the belt tensioning device of FIG. 7 with fitted cover disc;

FIG. 8 the ribs, in a development drawing,
A) of the belt tensioning device of FIG. 1;
B) in a first variant with arched extension in a first circumferential direction;
C) in a second variant with arched extension in a second circumferential direction;
D) in a further variant with inclined extension in a first circumferential direction; and
E) in a further variant with inclined extension in a second circumferential direction.

FIGS. 1 to 8, which are described jointly below, show an exemplary belt tensioning device 2. The belt tensioning device 2 comprises a base member 3 which can be attached to a stationary component such as an accessory (not shown), a tensioning arm 4 which is pivotably supported relative to the base member 3 by a bearing arrangement 5 around a pivot axis A, and a spring element 6 which resiliently supports the tensioning arm 4 against the base member 3 in a circumferential direction. For mounting the base member 3 has three flange portions 11 projecting radially outwards and having bores through which screws can be passed for attaching on the stationary component.

The tensioning arm 4 carries at a free end portion a tensioning roller 7, which is rotatable around an axis of rotation B arranged parallel to the pivot axis A. The tensioning roller 7 is rotatably supported on a reinforcing element 8 of the tensioning arm 4 and is attached thereto by a screw 9. Furthermore, a disc 10 is provided axially next to the tensioning roller 7, which protects the bearing 12 against penetrating dirt. The tensioning arm 4 is axially and radially supported relative to the base member 3 via the bearing arrangement 5 so as to be rotatable around the pivot axis A. The tensioning arm 4 is connected via a connection mechanism 13 to the base body 3. The tensioning arm 4 is arranged at least approximately in a plane with the bearing arrangement 5 so that the axial size of the device is small.

The spring element 6 is formed as a helical spring, wherein a spring center line or spring axis extends essentially parallel to the pivot axis A. A first spring end 16 of the helical spring 6 is bent radially outward and is supported on a corresponding abutment face 17 of the base member 3 in circumferential direction. The opposite second spring end 23 of the helical spring 6 is also bent radially outward and is supported on a corresponding abutment face 24 of the tensioning arm 4 in a circumferential direction. The helical spring 6 effects a spring-loaded tensioning of the tensioning arm 4 relative to the base member 3, so that the belt of the belt drive is pre-tensioned.

The helical spring 6 is arranged coaxially outside of the bearing arrangement 5 for supporting the tensioning arm 4. In this case, the helical spring 6 and the bearing arrangement overlap at least with partial portions in an axial direction to keep the design space small in the axial direction. It can be seen especially in FIG. 5 that the helical spring 6 has a proportionally large diameter in relation to the axial length. The number of turns is larger than one and smaller than two. Preferably, the circumferential extension of the helical spring 6 is between 540° and 690°. The ratio of nominal diameter D6 of the helical spring 6 to the axial length L6 is, in the mounted condition of the helical spring, in which the helical spring is axially pre-tensioned, between 3.0 and 9.0, especially between 5.0 and 8.0. It is to be understood that said values are not limiting and that other values can be used. Within said ranges all intermediate ranges can be considered. In principle, also—depending on the design space conditions—larger values than 9.0 can be used, whereby the spring would then be in relation to the diameter extremely short in axial direction. Furthermore, it should be understood that the named ratio of spring diameter to the axial length in the mounted condition is also dependent on the wire diameter of the spring wire. The larger the wire diameter the smaller the axial length of the helical spring 6 can be selected.

The belt tensioning device 2, in the tensioning arm 4, has a through opening 18, which is arranged coaxially to the longitudinal axis A. In this manner, the base member 3 can be screwed to an aggregate in a simple manner, wherein an end of the drive shaft can also extend into the through opening 18, if necessary. Overall, an axially very short design is achieved. At least in a portion of the through opening 18, a smallest inner diameter D18 of the through opening 18 is preferably larger than an outer diameter of the drive shaft (not shown) and is especially also larger than an outer diameter of the belt pulley (not shown) connected to the drive shaft. The base member 3 has an annular portion 25 for supporting the tensioning arm 4. From the annular portion 25 a flange portion extends radially outward, which serves as axial support face 21 for the helical spring 6. Several attachment portions 11 project radially outward from the flange portion, each attachment portion having a respective bore for attaching the base member 3 on the stationary component. The attachment portions 11 are arranged on a larger diameter relative to the flange portion and relative to the helical spring 6. Thus, forces and moments acting on the base member 3 can be supported well and transferred into the stationary component.

The helical spring 6 is inserted with axial pre-tension between the support face 21 of the base member 3 and an axial opposite support face 22 of the tensioning arm 4. In this manner, the tensioning arm 4 is loaded axially away from the base member 3, wherein said components are axially supported on each other via the connection mechanism. The support face 21 for the spring 6 extends via a circumferential partial portion of the base member 3. In this case, at least a partial portion of the support face 21 is arranged in a plane, which has an axial overlap with the drive shaft. The support face 21 of the base member 3 has in a circumferential direction the shape of a ramp, which is adapted to the incline of the helical spring 6. It can be seen especially in FIG. 1 that the support face 21 of the base member 3 is formed by circumferentially distributed and radially extending ribs on which the spring 6 is axially supported in the mounted condition. Between the ribs respective recesses 20 are formed, which prevent a mass accumulation in this area. Incidentally, the ribs effect in an advantageous manner a good transfer of frictional heat, which is produced during the operation of the belt tensioning device.

As especially visible in FIG. 5, the belt tensioning device 2 is formed such that the bearing arrangement 5 of the tensioning arm 4 is arranged on the base member 3 in view of the aggregate 28 behind the belt plane. The belt plane is the plane that is formed by the belt center in the mounted condition. The bearing arrangement 5 comprises one or several first bearing elements 30 which are associated to the base member 3, and a second bearing element 31 which is associated to the tensioning arm 4.

The first bearing elements 30 are, when seen in a half longitudinal section view, approximately C-like, and have radially inwards a cylindrical portion 32, from which two flange portions 33, 34 project radially outward. Thus, the first bearing elements 30 engage the annular portion 25 of the base body. In this case, the first flange portion 33, which is facing the tensioning arm 4, forms an axial bearing face to support the tensioning arm 4 in a first axial direction, while the second flange portion 34, which is axially distanced to the first flange portion 33, forms an axial bearing face for the tensioning arm 4 in an opposite second axial direction. The cylindrical portions 32 form a radial bearing face for the tensioning arm 4.

The first bearing elements 30 and the base member 3 are integrally produced, especially by multi component injection molding. In this case, the first bearing elements 30 are made from a different plastic material than the base member 3. The bearing material consists of a low friction plastic material, for example a high strength polyamide with polytetrafluorethylene-components (PTFE) with a strength of for example between 2,000 MPa and 4,000 MPa. Relative thereto, the plastic material of the base member 3 can be a fiber reinforced polyamide with a strength of for example between 15,000 MPa and 22,000 MPa. By means of the multi component injection molding method, the unit of the base member 3 with first bearing elements 30 can be manufactured in a simple manner and cheaply with one tool in one working step.

The tensioning arm 4 has a sleeve portion 39 onto which the second bearing element 31 is pressed, formed as a bearing bushing. The bearing bushing 31 is especially a formed sheet metal part and can for example be made from aluminum or an aluminum alloy. A bushing portion 27 of the bearing bushing and the cylindrical portion 32 of the first bearing element 30 form a radial bearing, while a flange portion 28 of the bearing bushing 31 and the flange portions 33 of the first bearing element 30 form an axial bearing.

Especially in FIG. 4 the connection mechanism 40 is visible, by which the tensioning arm 4 is connected to the base body 3. The connection mechanism 40 is formed like a bayonet connection and comprises several first connection elements 41 associated with the base member 3 and distributed along the circumference, and several second connection elements 42 corresponding thereto, which are associated with the tensioning arm 4. The first connection elements 41 are provided in the form of recesses, which interrupt the annular portion 25 of the base member 3. The second connection elements 42 are formed correspondingly as radial projections, which have a counter shape to the recesses, so that they can be inserted axially into the recesses. Thus, the tensioning arm 4 and the base member 3 can be connected to each other by an insertion and rotation movement.

In a first relative rotational position, which also can be designated as a bayonet position, the base member 3 and the tensioning arm 3 can be axially moved into one another. When the projections 42 of the tensioning arm 4 are completely passed through the recesses 41, the tensioning arm 4 can be rotated relative to the base member 3 into a second rotational position. In this second position, the projections 42 of the tensioning arm 4 are axially supported at least indirectly on the first bearing element 30, e.g., via the flange portion 34. In this position, the tensioning arm 4 and the base member 3 are axially fixed to each other and are axially pre-stressed against each other by the spring 6. To prevent that the two components 3, 4 from again accidentally turning into the bayonet-position, a securing pin 43 is provided which is inserted into a corresponding bore 44 of the tensioning arm and extends into a recess 45 of the base member 3 extending in circumferential direction. The abutment ends 46, 47 of the recess 45 form abutments in a circumferential direction, i.e., in the inserted condition of the securing pin 43, the tensioning arm 4 can only be moved relative to the base member 3 along the circumferential extension of the recess 45. Within this circumferential area, the projections 42 of the tensioning arm 4 always lie on the flange portion 34, i.e. the projections 42 and the recesses 41 are circumferentially offset relative to each other, so that a dismounting is prevented.

The connection mechanism 40 is formed such that the tensioning arm 4 and the base member 3 are only insertable into each other in the first rotational position (bayonet position). This is achieved such that the first and the second connection elements 41, 42 are arranged irregularly distributed across the circumference and only aligned exactly in one relative rotational position with each other. By this embodiment, the assembly is simplified and an incorrect mounting is prevented.

For pre-tensioning the belt tensioning device in a mounting position, the tensioning arm 4 and the base member 3 are rotated relative to each other until the mounting bores 36, 37 align with each other, so that the mounting pin 38 can be inserted into these. In this mounting position, the base member 3 of the belt tensioning device 2 is mounted on the aggregate. After completion of the mounting of the belt drive and of the belt around the drive pulley of the aggregate, the mounting pin 38 is pulled and the tensioning arm 4, due to the pre-tensioning force of the spring 6, is loaded against the belt.

As already mentioned above, preferably a high strength fiber reinforced plastic material can be used as base material for the base member 3 and the tensioning arm 4, for example a glass fiber reinforced polyamide. It can be seen especially in FIG. 5 that reinforcing elements 8, 26 are provided in the base member 3 and the tensioning arm 4, which are made from a different material. In particular, the base member 3 has reinforcing elements in the form of bushings 26 provided at the connection portions 11. The bushings 26 are made from a metal material and are over-molded with the plastic material of the base member 3. The tensioning arm 4 has a reinforcing element 8 formed as a metal bearing journal 8, which is over-moulded with the basic plastic material and serves as carrier for the bearing 12 of the tensioning roller 7.

As especially visible in FIGS. 6 and 7, which show a detail of the belt tensioning device 2 in an axial view from below, the flange portion 11 of the base body 3 encasing the bushing 26 can be made from a material with improved dampening features as compared to the basic plastic material. In this case, the connection portions 11 with damping material can be integrally formed together with the base member 3 with the basic material by multi component injection molding. By the damping material of the connection portions 11, the damping behavior of the belt tensioning device 2 is as a whole improved. For example, an elastomer or TPE can be used as damping material. This can especially have a Shore-hardness of 80 to 120. However, it is to be understood that the flange portions 11 can also be manufactured from the same basic plastic material as the rest of the base member. FIG. 6 shows the belt tensioning device 2 with a cover disc 35 mounted from below onto the first bearing element 30, respectively onto the flange portion 34, for protecting the bearing arrangement 5 against penetrating dirt. The cover disc 35 which is annularly formed is connected to the base member 3 after the tensioning arm 4 has been inserted and rotated onto the base member 3. For this, the cover disc 35 is placed onto the connection mechanism 40 and is form-fittingly connected to the base member 3. For connecting, several locking projections 29 are provided on an inner face of the base member 3 across the circumference, by which locking projections 29 the cover disc 35 is axially locked. It should be understood that also other form-fitting, force-fitting or material-locking connections can be considered. It is also possible that the cover disc is arranged below the connection element 42, i.e., between the connection elements and the bearing element 30. FIG. 7 shows the device without cover disc.

As already mentioned above, the through opening 18 of the tensioning arm 4 is formed such that the drive shaft and/or the belt pulley of an aggregate (not shown) can extend thereinto in the mounted condition. The wall of the tensioning arm 4 encasing the through opening 18 is provided with circumferentially distributed ribs 19. The ribs 19 serve especially for two functions, namely they transfer the frictional heat produced during operation away from the tensioning arm 4. Furthermore, the ribs 19 contribute to a targeted air supply in direction towards the aggregate, on which the belt tensioning device is mounted, to effectively cool it.

In the following, the diverse possible embodiments of the ribs 19 are described in more detail with reference to FIGS. 8A to 8E. In the embodiment of FIGS. 1 to 7 and 8a, the ribs are formed straight, i.e. they extend parallel to the axis of rotation A. In the embodiments of FIGS. 8B and 8C the ribs are arched, i.e., they are arched with increasing axial extension more strongly in radial direction. By this design, a deflection of the air flowing through the ribs is produced, which can be used in a targeted manner for cooling the aggregate. The difference between the embodiments of FIGS. 8B and 8C is only the rotational direction of the arch, which in one case it is directed to the right and in the other case to the left. In the embodiments of FIGS. 8D and 8E the ribs 19 are formed inclined or helical in relation to the longitudinal axis A. Thus, also a spin of the through-flowing air is produced. The difference between the embodiments of FIGS. 8D and 8E is in the direction of the inclination of the ribs, which in the one case is clock-wise and in the other case anti-clockwise.

In sum, the belt tensioning device 2 according to the invention offers the advantage of an especially compact and light design.

The invention claimed is:

1. A belt tensioning device for a belt drive, comprising:
a base member that is connectable to a stationary component;
at least one tensioning arm pivotably supported relative to the base member around a pivot axis, wherein the tensioning arm has an opening which is configured such that at least one of a drive shaft and a belt pulley of an accessory are extendable into said opening in a mounted condition, wherein a wall of the tensioning arm encasing the opening comprises ribs that are circumferentially distributed;
a spring element that resiliently supports the tensioning arm in a circumferential direction, wherein the spring element has a nominal diameter and an axial length in a mounted condition, and wherein a ratio of the nominal diameter to the axial length of the spring element is larger than 3.0 in the mounted condition, and
a tensioning roller arranged to tension the belt, the tensioning roller being rotatably supported on the tensioning arm around an axis of rotation, wherein the base member and the tensioning arm are each at least partially made from a plastic material.

2. The belt tensioning device of claim 1, further comprising a connection mechanism for connecting the tensioning arm to the base member, wherein the connection mechanism has at least one first connection element, which is associated to the base member, and at least one second connection element, which is associated to the tensioning arm, wherein the first connection element and the second connection element are configured to be connected to each other by an insertion and rotational movement.

3. The belt tensioning device of claim 2, wherein the connection mechanism is formed such that the tensioning arm and the base member are insertable into one another only in exactly one predetermined rotational position.

4. The belt tensioning device of claim 1, wherein the base member and the tensioning arm are manufactured from a glass fiber reinforced plastic material.

5. The belt tensioning device of claim 1, wherein at least one of the base member and the tensioning arm has at least one reinforcing element made from a metal material, which is over-molded with a plastic material.

6. The belt tensioning device of claim 1, further comprising a bearing arrangement provided between the base member and the tensioning arm for rotatably supporting the tensioning arm relative to the base member around the pivot axis, wherein the bearing arrangement has at least one bearing element associated to the base member and at least one bearing element associated to the tensioning arm.

7. The belt tensioning device of claim 6, wherein a plurality of bearing elements are provided at the base member and are arranged in segments along a circumference.

8. The belt tensioning device of claim 6, wherein the at least one bearing element and the base member are integrally formed as a single unit.

9. The belt tensioning device of claim 6, wherein the base member is made from a first plastic material and the at least one bearing element is made from a second plastic material, wherein the first and the second plastic material have different material characteristics.

10. The belt tensioning device of claim 6, wherein the at least one bearing element of the tensioning arm is made from a metal material.

11. The belt tensioning device of claim 1, wherein the ribs extend one of parallel, at an angle, or arched in relation to the pivot axis.

12. The belt tensioning device of claim 1, wherein at least one damping element is provided made from a dampening material that differs from the plastic material of the base member and the tensioning arm.

13. The belt tensioning device of claim 1, wherein the spring element is formed as a helical spring, wherein a spring axis of the helical spring extends at least substantially parallel to the pivot axis in the mounted condition, wherein the helical spring has a maximum of three complete turns.

14. The belt tensioning device of claim 1, wherein the ratio of the nominal diameter of the spring element to the axial length of the spring element is larger than 5.0 in the mounted condition.

15. The belt tensioning device of claim 1, wherein the ribs extend parallel in relation to the pivot axis.

16. A belt tensioning device for a belt drive, comprising:
a base member that is connectable to a stationary component;
at least one tensioning arm pivotably supported relative to the base member around a pivot axis;
a spring element that resiliently supports the tensioning arm in a circumferential direction, wherein the spring element has a nominal diameter and an axial length in a mounted condition, and wherein a ratio of the nominal diameter to the axial length of the spring element is larger than 3.0 in the mounted condition;
a tensioning roller arranged to tension the belt, the tensioning roller being rotatably supported on the tensioning arm around an axis of rotation, wherein the base member and the tensioning arm are each at least partially made from a plastic material; and
a connection mechanism for connecting the tensioning arm to the base member, wherein the connection mechanism has at least one first connection element, which is associated to the base member, and at least one second connection element, which is associated to the tensioning arm, wherein the first connection element and the second connection element are configured to be connected to each other by an insertion and rotational movement.

17. The belt tensioning device of claim 16, wherein the connection mechanism is formed such that the tensioning arm and the base member are insertable into one another only in exactly one predetermined rotational position.

18. The belt tensioning device of claim 16, wherein the base member and the tensioning arm are manufactured from a glass fiber reinforced plastic material.

19. A belt tensioning device for a belt drive, comprising:
a base member that is connectable to a stationary component;
at least one tensioning arm pivotably supported relative to the base member around a pivot axis;
a spring element that resiliently supports the tensioning arm in a circumferential direction, wherein the spring element has a nominal diameter and an axial length in a mounted condition, and wherein a ratio of the nominal diameter to the axial length of the spring element is larger than 3.0 in the mounted condition; and
a tensioning roller arranged to tension the belt, the tensioning roller being rotatably supported on the tensioning arm around an axis of rotation, wherein the base member and the tensioning arm are each at least partially made from a plastic material; and
a bearing arrangement provided between the base member and the tensioning arm for rotatably supporting the tensioning arm relative to the base member around the pivot axis, wherein the bearing arrangement has at least one bearing element associated to the base member and at least one bearing element associated to the tensioning arm,
wherein the base member is made from a first plastic material and the at least one bearing element is made from a second plastic material, wherein the first and the second plastic material have different material characteristics.

* * * * *